United States Patent [19]

Helms

[11] Patent Number: 4,489,832
[45] Date of Patent: Dec. 25, 1984

[54] TAMPER-EVIDENT CONTAINER

[75] Inventor: Charles R. Helms, Malvern, Pa.

[73] Assignee: Container Corporation of America, Chicago, Ill.

[21] Appl. No.: 511,858

[22] Filed: Jul. 8, 1983

[51] Int. Cl.³ .......................................... B65D 85/672
[52] U.S. Cl. .................................. 206/387; 206/807; 206/620; 206/601; 229/4.5
[58] Field of Search .............. 206/387, 523, 807, 620, 206/621, 622, 601; 229/4.5

[56] References Cited

U.S. PATENT DOCUMENTS

| 2,834,531 | 5/1958 | Struble | 206/807 |
| 3,747,745 | 7/1973 | Esashi et al. | 206/387 |
| 3,769,741 | 11/1973 | Hessier et al. | 206/523 |
| 3,871,516 | 3/1975 | Holkestad et al. | 206/387 |
| 4,106,597 | 8/1978 | Shook et al. | 206/523 |
| 4,245,741 | 1/1981 | Holkestad | 206/387 |
| 4,381,836 | 5/1983 | Rivkin et al. | 206/387 |
| 4,434,896 | 3/1984 | Beloate et al. | 206/807 |

FOREIGN PATENT DOCUMENTS

| 3123193 | 12/1982 | Fed. Rep. of Germany | 206/387 |
| 2030545 | 4/1980 | United Kingdom | 206/387 |

Primary Examiner—Joseph Man-Fu Moy
Attorney, Agent, or Firm—Richard W. Carpenter

[57] ABSTRACT

A box-like package with body and cover portions having a molded plastic frames and which includes, at one side thereof, a tab which must be broken away to afford access to the contents of the package.

5 Claims, 6 Drawing Figures

TAMPER-EVIDENT CONTAINER

BACKGROUND OF THE INVENTION

1. Field of the Invention

This invention relates to containers, and more particularly to a tamper-evident, box-like, composite container adapted for use in packaging of audio or video cassettes or similar type objects.

2. Description of the Prior Art

A prior art search in the U.S. Patent and Trademark Office directed to the subject matter of this application disclosed the following U.S. Pat. Nos.: 2,161,093; 2,884,123; 3,525,454; 3,711,011; 3,744,661; 3,807,551; 3,939,975; 4,253,572.

None of the prior art patents uncovered in the search disclosed a container having body and cover members attached to each other with one of the side walls being partially closed by a tamper-evident tab which must be detached from the container and removed to afford access to the contents of the container.

SUMMARY OF THE INVENTION

An object of the invention is to provide a tamper-evident, box-like container adapted for use in packaging of audio or video cassettes or similar type objects.

A more specific object of the invention is the provision, in a container of the type described, of detachable portions which must be severed from the remaining portion of the container and removed in order to afford access to the contents of the container.

Another more specific object of the invention is the provision, in the container of the type described, of a construction which includes main panels formed primarily of a sheet material such as paperboard and which are reinforced by molded plastic frames bonded to the main panels in an insert injection molding process.

These and other objects of the invention will be apparent from an examination of the following description and drawings.

It will be understood that, for purposes of clarity, certain elements may have been intentionally omitted from certain views where they are believed to be illustrated to better advantage in other views.

DESCRIPTION OF THE PREFERRED EMBODIMENT

Figure 1:
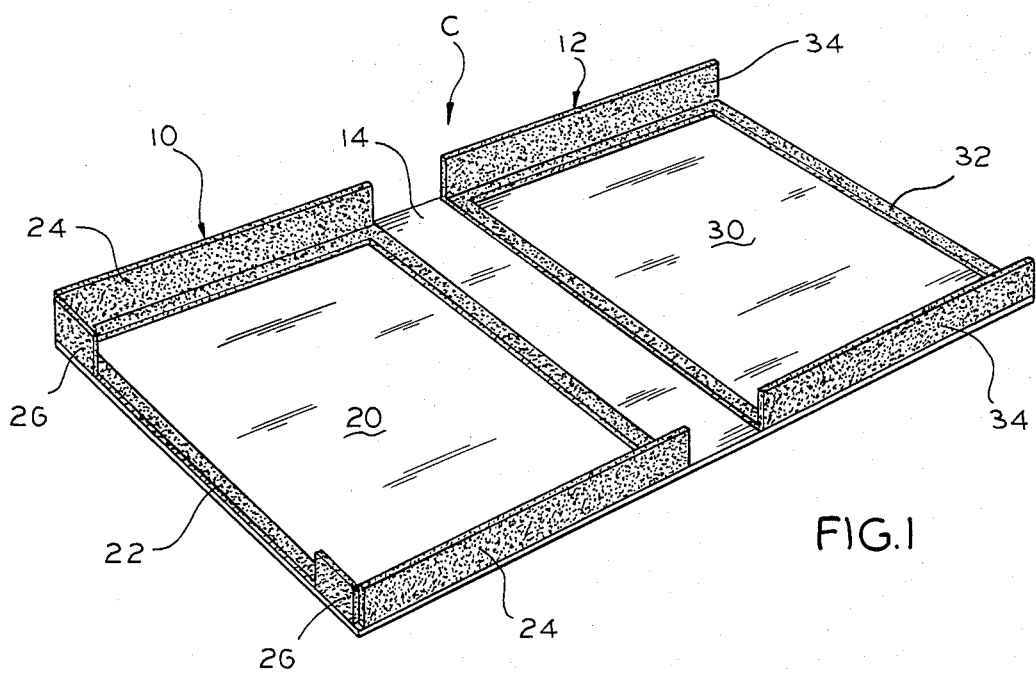
FIG. 1 is a perspective view of a container embodying features of the invention, as shown prior to filling and closing.
Figure 2:
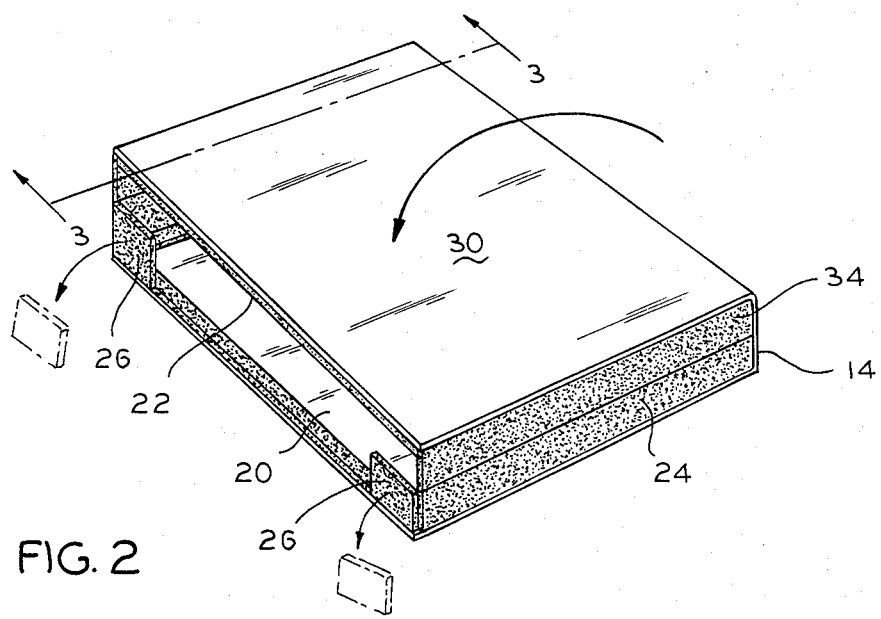
FIG. 2 is a perspective view of the structure illustrated in FIG. 1, shown after the container has been filled and closed.
Figure 3:
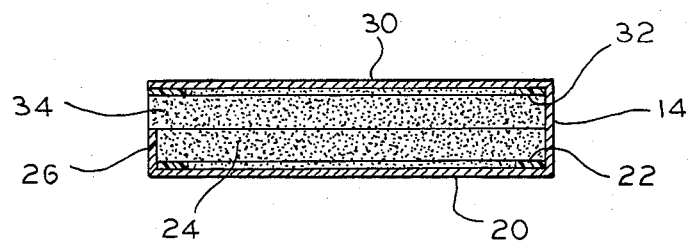
FIG. 3 is a transverse, vertical sectional view taken on line 3—3 of FIG. 2.

Referring now to the drawings for a better understanding of the invention, and particularly to FIGS. 1 and 2, it will be seen that the novel container or case indicated generally at C comprises a pair of body and cover members 10 and 12, respectively, which are initially hingedly attached to each other by a rear wall panel 14.

Body member 10 includes a relatively thin, flat main panel 20 which serves as the bottom wall of the container. This panel is preferably formed of flexible, printable material such as paperboard but may be formed of plastic if desired. Panel 20 is reinforced by a molded plastic frame which include front, rear and rear strips 22 and end panels 24. Body member 10 also includes a pair of tamper-evident tabs 26 which are joined to the frame at adjacent opposite ends thereof. The purpose of these are described later in the specification.

Cover member 12 of the container also includes a main panel or upper wall 30 which is reinforced by a frame including front and rear strips 32 and end panels 34.

In the embodiment illustrated in FIG. 1 the frames are attached to the main panels and to the rear wall panel 14 at the same time, preferably by an insert injection molding process, to provide an integral unit which, in this case, has cover and bottom members each having a depth equal to one-half the depth of the full container.

In closing the container, after the packaged article has been placed on the bottom wall panel 20 of the body member, the cover member is folded over, and the adjacent edge portions of the end panels of the body and cover members are fused or bonded to each other in any desired manner such as by sonic welding.

As best seen in FIG. 2, in order to remove the contents of the container through the opening at the front side thereof, it is necesssary to break away the tamper-evident tabs 26 which block entry to the container.

Thus, the package cannot be opened without destroying the integrity of the package to some extent, thereby providing visual proof that the package has been opened.

Figure 4:
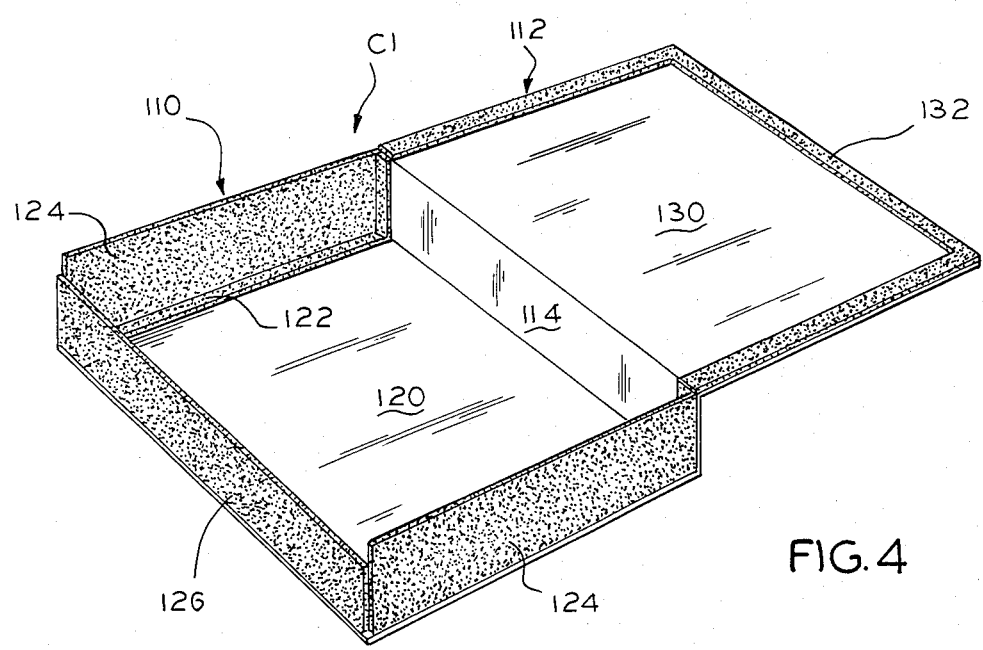
FIGS. 4, 5 and 6 are views similar to those of FIGS. 1, 2, and 3, respectively, but illustrate a modified form of the invention.
Figure 5:
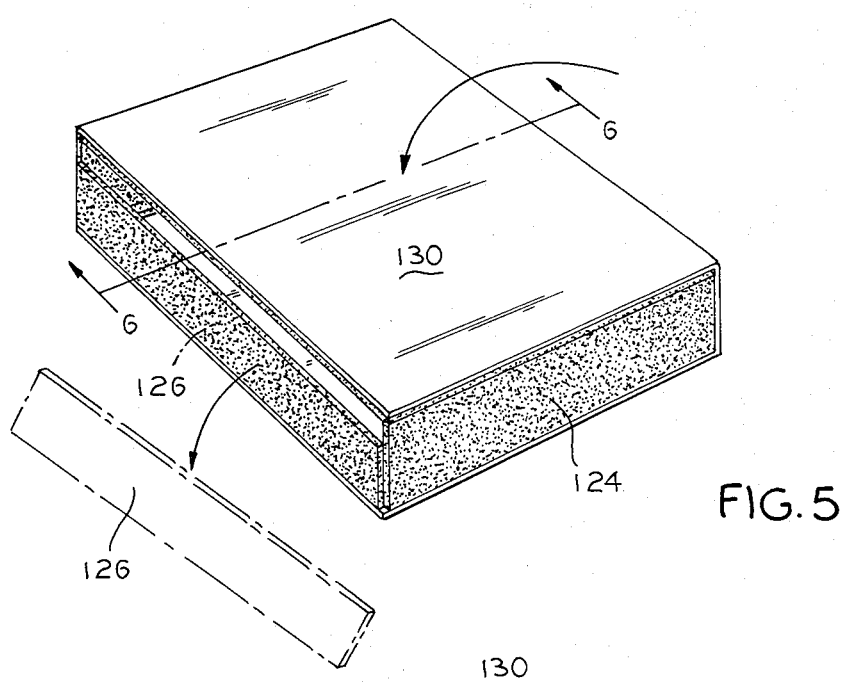
Figure 6:
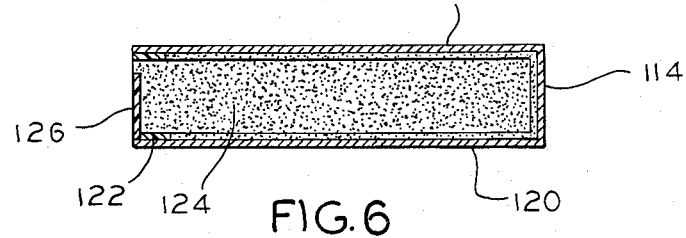

Turning now to FIGS. 4 through 6, it will seen that a slightly modified form of the invention is shown. In this case again there is a body member 110 and cover member 112 which are joined by a rear wall panel 114. Each of the members includes a primary panel preferably formed of paperboard and having a plastic frame.

In the embodiment illustrated in FIG. 4 the primary panel 120 is provided with a frame 122 which includes end panels 124 and a detachable front panel 126 which serves as the tamper-evident tabs did in the previously described embodiment.

In this embodiment the body member is the full depth of the container; whereas the cover member is a shallow lid including only a primary panel 130 and frame 132.

In forming the container of this embodiment, after the contents have been placed within the body member, the cover is folded over and portions of the cover member frame are welded to the corresponding portions of the body member frame to provide a closed container.

In order to remove the contents of the container it is necessary to first break away the tamper-evident panel 126.

Thus, it will be appreciated that in each embodiment there is provided a tamper-evident container of relatively simple design and construction whereby if any one attempts to tamper with the container, the evidence of such tampering will be clearly displayed.

What is claimed is:

1. A composite, tamper evident container for the packaging of audio or video cassettes or the like, comprising:

(a) a pair of generally similar body and cover members each including:

(i) a relatively thin paperboard main panel;

(ii) a molded plastic frame bonded to said main panel in an insert injection molding process and including a pair of end panels extending from opposite ends of said main panel and normal thereto and a pair of elongated, plastic, corner strips secured to said main panel at the front and rear edges thereof between said end panels;

(b) a relatively thin paperboard common rear wall panel extending between and secured to adjacent rear corner strips of respective members;

(c) said cover member being initially hingedly attached to said body member by said common rear panel and being adapted to be folded over on top of said body member to cover the latter after an article to be packaged has been inserted therebetween;

(d) said container having at an otherwise open front side thereof a detachable tab which must be broken away to afford access to the interior of said container through said otherwise open side;

(e) said cover and body members having their end panels bonded to each other and their front corner strips bonded to said detachable tab to form a closed container.

2. A container according to claim 1, wherein said body member has a depth equal to the full depth of the container.

3. A container according to claim 1, wherein said container body member main panel, cover member main panel, and a central panel, which serves as a body member rear wall panel and a hinge for joining said body and cover members, are formed from a common blank of paperboard.

4. A container according to claim 1, wherein said tab comprises one side wall of said container.

5. A container according to claim 1, wherein said body and cover member frames are joined to each other by sonic welding.

* * * * *